_United States Patent Office_

3,434,998
Patented Mar. 25, 1969

3,434,998
MODIFIED ORGANIC BASE FRICTION MATERIAL
F. William Aldrich and Theodore E. Deane, Troy, N.Y., assignors to The Bendix Corporation, a corporation of Delaware
No Drawing. Filed Sept. 13, 1965, Ser. No. 487,052
Int. Cl. C08g 51/08; C09k 3/14; F16d 69/02
U.S. Cl. 260—38      5 Claims

ABSTRACT OF THE DISCLOSURE

An organic base friction material having dispersed therein chunks of a semi-metallic friction modifying material to serve as the friction controlling means. The semi-metallic modifier being essentially high concentrations of metal and metal oxide powders in a base organic resin matrix.

---

In order to obtain the ultimate in friction characteristics, particularly high friction level for an organic type brake lining or friction material, it is necessary to add friction modifiers. The most common of these friction modifiers are the cured resinous particles such as that derived from cashew nut shell liquid. The use of such cashew resin particles results in increased frictional effectiveness of the base lining or frictional material, particularly at ambient or relatively-low temperatures. However, such use has the disadvantage of decreased fade resistance or decreased effectiveness at elevated temperatures, poor recovery, and also the disadvantage of decreased effectiveness over long term normal use (observed as an increase in required pedal pressure over life of brake lining).

An alternate to the use of such cured resinous particles is the use of inorganic materials of abrasive characteristics. Such materials, for example alumina, will offer increased effectiveness and will also offer improved fade resistance, improved recovery properties, and less hardening (pedal pressure increase) with extended use. Such inorganic materials, however, also have definite disadvantages in increased noise characteristics and excessive wearing, grooving, or general destruction of the mating surface (brake drum or disc).

It is an object of the present invention to provide a semi-metallic friction modifier for organic base lining to provide increased friction effectiveness at both low and elevated temperatures without displaying poor fade resistance, recovery, long-term hardening, excessive wear, or scoring.

It is another object of the present invention to provide an improved friction modifier for organic base lining comprised of a semi-metallic particle or chunk consisting of a metal powder or metallic oxide powder matrix, a ceramic constituent, and powdered graphite all bound together under heat and pressure by a thermosetting phenolic resin binder.

The friction modifier of the present invention is for use with an organic base lining of the conventional type consisting of a resin base with additive organic friction modifiers, asbestos and the like.

The semi-metallic friction modifier or friction controlling means added to the basic organic lining preferably comprises 1½ to 20% by volume of the total lining material. Below 1½%, effectiveness is not obtained; above 20%, processing limitations cause the addition to become uneconomical. A functional upper limit is 25% wherein the abrasive content can be expected to have deleterious effects with respect to drum or disc wear.

The semi-metallic is to be added as a particle or chunk size greater than 20 mesh since the effect is masked at smaller particle sizes. There is effectively no upper limit on particle size and the entire 25% of semi-metallic may be comprised of a single large particle or insert in the base organic. However, to facilitate processing, a preferred particle size range is from plus 20 to minus 4 mesh.

The preferred composition of the semi-metallic friction modifying particle is as follows:

| Constituent | Vol., percent |
| --- | --- |
| Organic resin binder | 20 and over |
| Graphite | 15–25 |
| Ceramic powder | 10–25 |
| Metal or metal oxide powder | 30–50 |

The processing sequence is to manufacture a semi-metallic friction modifying particle by combining the metal or metal oxide powder, ceramic powder and powdered graphite in an organic resin binder of the thermosetting phenolic resin type which is then cured under heat and pressure to form a blended rigid mass of semi-metallic material. This material is then broken into particles of a size greater than 20 mesh and added to a conventional organic brake lining mix, comprising preferably 1½ to 20% of the volume of the finished lining material. The organic lining material with semi-metallic particle added is then processed, cured and shaped into a finished organic brake lining segment or block. The appearance of the lining can best be described as mottled compared to conventional linings when the semi-metallic particle size is within the preferred size range of plus 20 minus 4 mesh.

Suitable ceramic constituents are sillamanite, mullite, magnesium oxide and zirconium oxide. Best results are obtained with ceramics of the aluminum silicate type; i.e. sillamanite and mullite, although others may be usable.

Preferred metals and metal oxides are copper, iron and iron oxide. Many other metals may be used, depending to a significant extent on cost. Soft iron oxide, $Fe_2O_3$, is a substitute for metals rather than ceramics. It will be noted that the organic resin is the primary binder and the metal is not required for this purpose. Generally speaking, the line of distinction between ceramics and metal oxides which can be substituted for the metal content depends on the abrasive or hardness characteristic.

Brake lining, manufactured in accordance with the above teachings, represents a significant advance over conventional organic linings known in the prior art. Generally speaking, the advance is in terms of increased lining friction effectiveness under various conditions of operation. Comparison tests reveal that increased effectiveness is most pronounced under severe conditions of operation where conventional organic linings are the weakest. For example, brake fade induced by high temperature, caused by frequent brake application in short time intervals, is lessened from 10 to 70%. Recovery of effectiveness after fade is increased in excess of 25%. High speed and burnish (wear in) effectiveness is improved by a similar degree. While to some extent these are predictable results of high friction characteristics of metal and ceramic particles resistant to deterioration at high temperature, the main significance of the present invention resides in the fact that this improvement is achieved without sacrificing lining wear or scoring the mating brake surface such as encountered with metal base or inorganic linings. In fact, test results have demonstrated an increase in lining life of greater than 20% comparing an organic with 10% semi-metallic particles with a full organic of the same type.

We claim:
1. A modified organic base friction material consisting of an organic base friction lining material containing from 1½ to 25% by volume of a semimetallic particle of a size greater than 20 mesh; said semi-metallic particle having as constituents by volume percent graphite from 15–25%, ceramic powder from 10–25%, and metal or metal oxide from 30–50% being bound together by an organic resin binder from greater than about 20%.

2. A modified organic base friction material as claimed in claim 1 wherein said organic resin binder is a thermosetting phenolic resin.

3. A modified organic base friction material as claimed in claim 1 wherein said ceramic powder is a ceramic selected from the group consisting of sillamanite, mullite, magnesium oxide, zirconium oxide or mixtures thereof.

4. A modified organic base friction lining material as claimed in claim 1 wherein said metal or metal oxide is selected from the group consisting of iron copper, iron oxide, or mixtures thereof.

5. A modified organic base friction material consisting of an organic base friction lining material containing from 1½ to 20% by volume of a semi-metallic particle within the size range of plus 20 minus 4 mesh; said semi-metallic particle having as constituents by volume percent graphite from 15–25%, ceramic powder from 10–25%, and metal or metal oxide from 30–50% being bound together by an organic resin binder from greater than about 20%.

References Cited

UNITED STATES PATENTS 3,007,549   11/1961   Klein.
3,210,303   10/1965   Biggs.

MORRIS LIEBMAN, *Primary Examiner.*

R. BARON, *Assistant Examiner.*

U.S. Cl. X.R.

106—36